Figure 1:
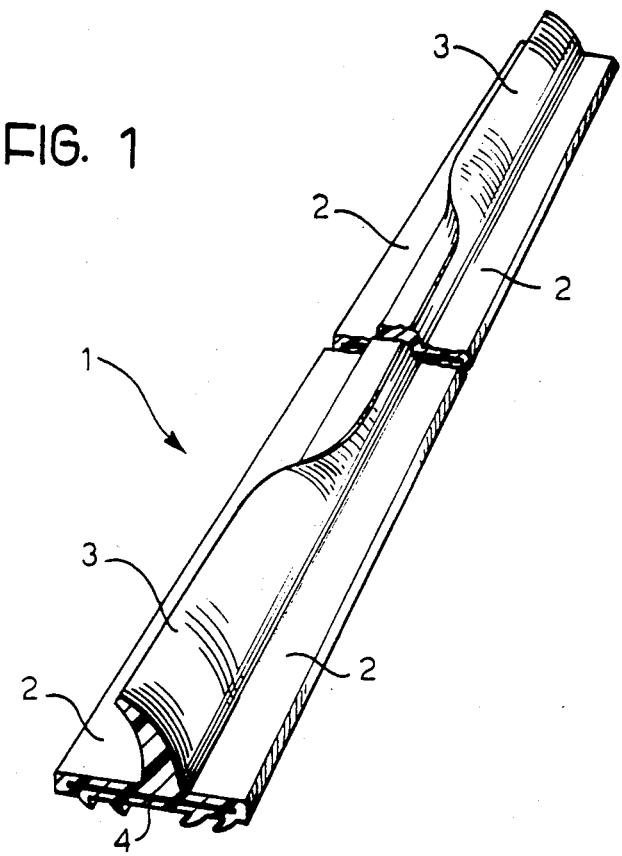

United States Patent [19]

Azzola et al.

[11] Patent Number: 4,576,773

[45] Date of Patent: Mar. 18, 1986

[54] METHOD AND APPARATUS FOR EXTRUDING WEATHER STRIP FOR MOTOR-VEHICLES

[75] Inventors: Roberto Azzola, Turin; Luciano Carrera, Cirié, both of Italy

[73] Assignee: S.A.I.A.G. S.p.A., Italy

[21] Appl. No.: 576,653

[22] Filed: Feb. 3, 1984

[30] Foreign Application Priority Data

Feb. 3, 1983 [IT] Italy .................. 67112 A/83

[51] Int. Cl.$^4$ .................. B29C 47/02; B29C 53/04
[52] U.S. Cl. .................. 264/167; 264/171;
264/174; 264/177 R; 264/210.3; 264/210.4;
425/113; 425/131.1; 425/319; 425/325;
425/391; 425/465
[58] Field of Search .......... 264/171, 174, 167, 177 R,
264/210.2, 210.3, 210.4; 425/465–466, 131.1,
113, 319, 391, 325

[56] References Cited

U.S. PATENT DOCUMENTS

| | | | |
|---|---|---|---|
| 2,392,336 | 1/1946 | Nissen | 425/381 |
| 2,723,424 | 11/1955 | Veit | 425/325 |
| 2,831,215 | 4/1958 | Piemont | 264/286 |
| 3,066,063 | 11/1962 | Ecklund et al. | 264/210.2 |
| 3,796,532 | 3/1974 | Needleman | 425/325 |
| 3,837,957 | 9/1974 | Mesnel | 264/285 |
| 3,886,250 | 5/1975 | Danko | 264/177 R |
| 3,932,090 | 1/1976 | Brumlik | 425/466 |
| 4,233,259 | 11/1980 | Pietratus et al. | 425/465 |
| 4,419,315 | 12/1983 | Kessler | 425/465 |

FOREIGN PATENT DOCUMENTS

| | | | |
|---|---|---|---|
| 2404252 | 8/1974 | Fed. Rep. of Germany | 264/295 |
| 2617123 | 10/1977 | Fed. Rep. of Germany | 264/167 |
| 2310201 | 1/1977 | France | 425/466 |

Primary Examiner—Jeffery Thurlow
Attorney, Agent, or Firm—Sughrue, Mion, Zinn, Macpeak, and Seas

[57] ABSTRACT

An extrusion head is disclosed, for extruding weather strips of elastomeric material, particularly for motor vehicles, of the type comprising an anchoring section and a longitudinal sealing section in the form of a tab coextruded with the anchoring section. The extrusion head comprises a die with an extrusion orifice having a shape corresponding to the cross-section of the weather strip to be extruded, and a deflector device adapted, when actuated, to change the inclination or orientation of the sealing section relative to the anchoring section during extrusion.

3 Claims, 2 Drawing Figures

U.S. Patent  Mar. 18, 1986  4,576,773

METHOD AND APPARATUS FOR EXTRUDING WEATHER STRIP FOR MOTOR-VEHICLES

The present invention relates to an extrusion head for extruding weather strips of elastomeric material, particularly for motor vehicles, of the type comprising an anchoring section and a longitudinal sealing section in the form of a tab coextruded with the anchoring section.

Such weather strips are used, for example, as seals for the edges of the doors or other closure elements of the motor vehicle.

Normally, the sealing section in the form of a tab has substantially the same inclination or orientation relative to the anchoring section along the entire length of strip for a door of a motor vehicle. In some particular cases, however, the shape of the edge of the door and the shape of the edge of the corresponding aperture in the bodywork of the motor vehicle are such as to require the tab of the sealing section of several portions of the weather strip to have a reversed orientation or, generally, a different inclination to the anchoring section. This requirement sometimes occurs in the portions of the weather strips intended to be applied to the section of the edge of the door close to the hinges.

FIG. 1 of the appended drawings shows, in perspective, a length of weather strip 1 comprising an anchoring section 2 along which extends a sealing section 3 in the form of a tab. In the example shown in this drawing, the anchoring section 2 of the weather strip has an internal stiffening reinforcement 4. This anchoring section, which in the drawing has a flattened form before it is applied to the edge of a closure element of the edge of an aperture in the bodywork of a motor vehicle, is bent into a U-shape with the longitudinal sealing tab 3 projecting from the convex face of the U.

The end portions of the longitudinal sealing tab 3 of the length of weather strip shown in FIG. 1 are oriented or inclined towards the left-hand edge of the anchoring section 2. The middle portion 3′ of this tab, however, has a reversed orientation, that is, it is inclined towards the right-hand edge of the anchoring section 2.

According to the prior art, a length of weather strip of the type shown in FIG. 1 was formed from an extruded, vulcanised weather strip having a longitudinal sealing tab which has the same orientation or inclination over the entire length of the weather strip. The "reversal" or different inclination of a portion of the sealing tab was then produced by subsequent hot deformation of a portion of the tab.

This method has the disadvantage of being rather slow and of necessitating a further working step to achieve the hot deformation of the particular portions of the weather strip.

Moreover, in practice, this technique was used only to "reverse" short sections of the tab, since hot deformation was too expensive for sections of considerable length.

Alternatively, a length of weather strip of the type shown in FIG. 1 could be made by welding together different pieces of weather strip with sealing tabs having different inclinations or orientations to the anchoring sections.

This method is also unsatisfactory in that it requires a further welding operation for the different pieces of weather strip and is also very expensive.

The object of the present invention is to provide a device, and in particular an extrusion head, which enables weather strips of the type specified above to be formed directly during extrusion with portions of the longitudinal sealing tab in predetermined positions having a reversed orientation relative to the remaining portions, without necessitating further operations on the weather strip after its extrusion.

This object is achieved, according to the invention by means of an extrusion head the main characteristic of which lies in the fact that it includes a deflector device which, when actuated, changes its inclination or orientation of the sealing section relative to the anchoring section during the extrusion.

According to a further characteristic, the deflector device is arranged to cause essentially a rotation of the sealing section about its line of attachment to the anchoring section at the outlet from the extrusion die.

Further, the invention relates also to a method for extruding weather strips, which is characterised in appended claim 4.

Figure 2:
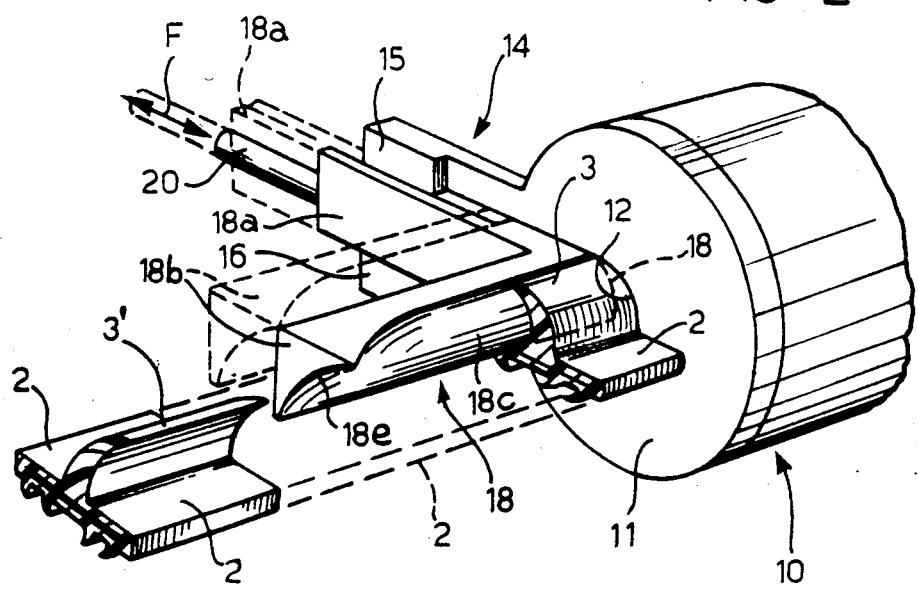

Further characteristics and advantages of the device according to the invention will appear from the detailed description which follows with reference to the appended drawings, provided purely by way of non-limiting example, in which:

FIG. 1, already described, shows a length of weather strip with a longitudinal sealing tab having a reversed portion, and FIG. 2 is a perspective view of a part of an extrusion head according to the invention.

In FIG. 2, an extrusion head, generally indicated 10, has an extrusion die 11 with an extrusion orifice or aperture 12. The form of this extrusion orifice corresponds essentially to the cross-section of the end sections of the weather strip 1 shown in FIG. 1.

The die 11 has a lateral appendage, generally indicated 14, having two opposite projections 15, 16 acting as guides for a deflector member, generally indicated 18. This deflector member is substantially L-shaped with a first arm 18a mounted for movement between the guides 15, 16 in the direction indicated by the arrows F, in a plane parallel to the plane containing the end face of the extrusion die 11. The other arm 18b of the deflector member 18 projects substantially along the direction of output of the weather strip 1 from the extrusion head 10. The arm 18b of the deflector member has a deflection surface 18c which, on the side facing the extrusion head 10, has an initial profile 18d corresponding essentially to the profile of the left-hand face (in FIG. 2) of the longitudinal tab 3 of the weather strip leaving the extrusion head. In the example illustrated, the initial profile 18d of the deflection surface 18c is convex.

At the end opposite to the extrusion die 11, the deflection surface has a final profile 18e which is concave. From the initial profile 18d to the final profile 18e, the deflection surface 18c has a continuous variation of profile and changes gradually from the convex profile to the concave profile.

The arm 18a of the deflector member 18 is connected to a shaft 20 through which drive means (not illustrated) of conventional type, when actuated, cause the movement of the deflector member 18 in the direction of the arrows F.

The deflector member, in use, may take up a rest position (illustrated in broken outline in FIG. 2) in which it does not interfere with the weather strip leaving the extrusion die 11. Under these conditions, the longitudinal tab 3 of the extruded weather strip has its concave surface facing the left-hand edge of the anchoring section 2.

When the deflector member 18 is moved towards the extrusion orifice 12 and is located in the working position (illustrated in full outline in FIG. 2), the initial profile 18d substantially coincides with the portion of the edge of the extrusion orifice defining the left-hand face (see FIG. 2) of the sealing tab 3 of the weather strip. At the outlet from the extrusion orifice, the longitudinal sealing tab 3 of the weather strip has under these conditions also, its concave surface facing towards the left-hand side of the anchoring section. As the weather strip advances, its concave face, which slides in contact with the initial portion of the deflection surface 18c is gradually deformed by this deflection surface since, at the outlet from the extrusion die 11, the elastomeric material which constitutes it has considerable plasticity. As the weather strip leaving the extrusion head advances, the longitudinal tab 3 is progressively reversed and assumes the final profile of the deflection surface.

When the deflector member 18 is kept in the working position, the sealing tab of the extruded weather strip passing over the final profile 18e of the deflector member is reversed, as shown by the portion 3' of this tab in FIG. 2.

In order to synchronise the operation of the deflector device with the advance of the weather strip leaving the extrusion head, the process and apparatus described in Italian Patent Application No. 68449-A/82 filed in the name of the same applicants may be used.

Thus, it is possible, by virtue of the invention, to form lengths of weather strip in which the longitudinal sealing tab is reversed in predetermined positions directly during the extrusion phase. Hence, further operations on the weather strip are no longer necessary.

We claim:

1. An extrusion device for extruding a weather strip of elastomeric material having a substantially flat anchoring section and a longitudinally sealing section in the form of a tab coextruded with the anchoring section and connected to the anchoring section along a straight line with the tab being inclined to one side of a plane perpendicular to the anchoring section along said straight line, said extrusion device comprising an extrusion head having a die with a fixed configuration extrusion orifice corresponding to the cross-section of the weather strip to be extruded, moveable deflector means disposed adjacent said extrusion orifice and adapted to be moved into and out of engagement with said tab to selectively change the inclination of said tab relative to said anchoring section from one of said plane to the other side of said plane; said moveable deflector means comprising a deflector member having a deflection surface adapted to contact said tab and having an initial profile at one end thereof corresponding essentially to the profile of one face of said tab as it emerges from said extrusion orifice, a final profile at the opposite end thereof having an inclination different from that of the initial profile and a continuously variable intermediate surface extending from said initial profile to said final profile, and means for mounting said deflector member for movement relative to said extrusion orifice between a rest position in which said deflection surface does not interfere with the weather strip leaving the extrusion orifice and a working position in which the deflection surface is disposed adjacent said extrusion orifice with said initial profile coinciding with the corresponding portion of said extrusion orifice whereby the tab upon leaving the extrusion orifice slides in contact with the deflection surface and is plastically deformed to gradually assume the final profile of the deflection surface.

2. A method for extruding weather strips of elastomeric material comprises extruding a strip of elastomeric material from a fixed configuration extrusion orifice in an extrusion head having a substantially flat anchoring section and a longitudinal sealing section in the form of a tab connected to the anchoring section along a straight line and inclined relative to said anchoring section on one side of a plane perpendicular to said anchoring section along said straight line and selectively moving a deflector member having a variably contoured deflection surface with an initial profile coinciding with the corresponding portion of said extrusion orifice into engagement with one surface of said tab subsequent to the extrusion of said strip to gradually deflect said tab to change the inclination thereof relative to said anchoring section.

3. A method for extruding weather strips of elastomeric material as set forth in claim 2, further comprising selectively moving said deflector member into and out of engagement with said tab to selectively vary the inclination of said tab relative to said anchoring section along selected portions of the length of said strip.

* * * * *